US005664236A

United States Patent [19]
Utagawa

[11] Patent Number: 5,664,236
[45] Date of Patent: Sep. 2, 1997

[54] FOCUS ADJUSTMENT DEVICE AND METHOD

[75] Inventor: Ken Utagawa, Kanagawa-ken, Japan

[73] Assignee: Nikon Corporation, Tokyo, Japan

[21] Appl. No.: 497,154

[22] Filed: Jun. 30, 1995

[30] Foreign Application Priority Data

Aug. 24, 1994 [JP] Japan ................................. 6-199331

[51] Int. Cl.⁶ ............................. G03B 3/00; G03B 13/00
[52] U.S. Cl. .......................... 396/96; 396/104; 396/125; 396/128
[58] Field of Search ................................. 354/402, 406, 354/407, 408; 396/96, 104, 125, 128

[56] References Cited

U.S. PATENT DOCUMENTS

| | | |
|---|---|---|
| 4,783,677 | 11/1988 | Hamada et al. |
| 4,792,820 | 12/1988 | Norita et al. ............................ 354/402 |
| 4,942,418 | 7/1990 | Norita et al. ............................ 354/408 |
| 4,980,715 | 12/1990 | Utagawa . |
| 5,012,267 | 4/1991 | Higashihara . |
| 5,019,851 | 5/1991 | Azuma et al. ............................ 354/402 |
| 5,060,002 | 10/1991 | Ohnuki et al. |

FOREIGN PATENT DOCUMENTS 60-214325  10/1985  Japan .

Primary Examiner—Safet Metjahic
Assistant Examiner—Eric Nelson
Attorney, Agent, or Firm—Oliff & Berridge

[57] ABSTRACT

A focus adjustment device for a camera includes a focus detection system, a controller including a drive amount calculation section that calculates the amount of lens movement required to focus on a photographic object based on a detected defocus amount, a memory section that stores the detected defocus amount, and an adjusted drive amount calculation section that statistically processes a plurality of stored defocus amounts. The adjusted drive amount calculation section calculates the adjusted drive amount required to properly focus the photographic lens on the subject and prevents unstable movements of the photographic lens in the vicinity of the focus position. The controller drives the photographic lens according to the adjusted drive amount after the commencement of a shutter release operation and before film exposure. In addition, the focus adjustment drive may advantageously utilize image plane positions derived from the defocus amounts and the lens movement to calculate a drive amount and/or an adjusted drive amount, which is particularly desirable for focusing on moving photographic objects.

22 Claims, 6 Drawing Sheets

FOCUS ADJUSTMENT DEVICE AND METHOD

BACKGROUND OF THE INVENTION

1. Field of the Invention

This invention relates to a focus adjustment device and method for a camera that accomplishes focus adjustment of a photographic lens to properly focus the camera on a photographic object.

2. Description of Related Art

In well known focus adjustment devices, detection of the focus adjustment state of the photographic lens is accomplished by determining a defocus amount, the defocus amount representing the difference between the image plane of the photographic object and the specified detection surface (i.e., the conjugate film surface). The photographic lens is driven based on the defocus amount to focus the camera.

In a single focus mode, the photographic lens focuses on the photographic object once, then the lens is no longer driven. In a continuous focus mode, defocus detection is repeatedly accomplished after the initial focusing, and if the amount of detected defocus exceeds upper or lower standard parameters, the lens is driven again to maintain the camera's focus on a subject. Ordinarily, the operation of the continuous focus mode is initiated by depressing a release button halfway. If the range between the upper and lower standard parameters is reduced, the camera is very sensitive to the detected amount of defocus, and the photographic lens is driven in a "hunting" state, wherein the lens is continually moving small amounts to adjust the camera's focus. On the other hand, if the range between the upper and lower standard parameters is increased, then the unstable photographic lens movements will disappear. However, if at the time of shutter release (i.e., complete depression of the release button) the camera is improperly focused, and a photograph is taken with a slight blurring due to the improper focus.

SUMMARY OF THE INVENTION

An object of the present invention is to prevent unstable movements of the photographic lens when in the vicinity of a focus position and also to provide a focus adjustment device that achieves accurate focus of a photographic object at rest when a shutter release (complete depression) occurs. Also, an object of the invention is to provide a photographic focus adjustment device that achieves accurate focus of a moving photographic object when a shutter release (complete depression) occurs.

In one embodiment of the invention, there is provided a focus adjustment device for focusing a photographic lens in a camera, comprising a focus detecting section for repeatedly detecting a defocus amount; a section for storing a plurality of defocus amounts detected by the focus detecting section; a drive amount calculation section for calculating a drive amount based on the defocus amount detected by the focus detecting section; an adjusted drive amount calculation section for calculating an adjusted drive amount by statistically processing the plurality of defocus amounts stored by the storing section; and a control section for controlling driving of the photographic lens based on the drive amount calculated by the drive amount calculation section prior to a shutter release operation, the control section not driving the photographic lens until a magnitude of the defocus amount exceeds a predetermined value after an in-focus state has been determined based on the detected defocus amount prior to the shutter release operation (complete depression); and for controlling driving the photographic lens based on the adjusted drive amount calculated by said adjusted drive amount calculation section when the shutter release operation (complete depression) occurs.

The focus adjustment device may also include a statistical processing determining section for determining whether statistical processing of the plurality of defocus amounts by the adjusted drive amount calculation section is appropriate, and for causing the adjusted drive amount calculation section to perform statistical processing of the plurality of defocus amounts when determined to be appropriate by the statistical processing determining section.

The adjusted drive amount calculation section may calculate the adjusted drive amount based on an average value of the plurality of defocus amounts stored by the storing section, the defocus amounts used for statistical processing being obtained after reaching the in-focus state.

The adjusted drive amount calculation section may include a section for removing inappropriate data such that statistical processing by the adjusted drive amount calculation section is performed after removal of the inappropriate data by said removal section.

The focus adjustment device may include a section for limiting at least one of a storage time for defocus amounts and a number of defocus amounts stored, such that statistical processing by the adjusted drive amount calculation section is performed with a recent data set. In another embodiment of the invention, a focus adjustment device comprises a focus detecting section for repeatedly detecting a defocus amount; a storing section for storing a plurality of defocus amounts detected by the focus detecting section; an image plane position calculation section for calculating a plurality of image plane positions based on the plurality of defocus amounts stored by the storing section; a drive amount calculation section for calculating a drive amount based on the image plane positions calculated by said image plane position calculation section; an adjusted drive amount calculation section for calculating an adjusted drive amount by statistically processing the plurality of image plane positions calculated by the image plane position calculation section; and a control section for controlling driving of the photographic lens based on the drive amount prior to a shutter release operation, and for controlling driving of the photographic lens based on the adjusted drive amount when a shutter release operation occurs.

The focus adjustment device may further comprise a statistical processing determining section for determining whether statistical processing of the plurality of image plane positions by the adjusted drive amount calculation section is appropriate, and for causing said adjusted drive amount calculation section to perform statistical processing of the plurality of image plane positions when determined to be appropriate by the statistical processing determining section.

The adjusted drive amount calculation section may calculate the adjusted drive amount based on regression analysis of the plurality of image plane positions as a function of time.

The adjusted drive amount calculation section may further comprise a section for selecting data for evaluation such that statistical processing occurs after removal of inappropriate data.

The focus adjustment device may further comprise a section for limiting at least one of a storage time for image plane positions and a number of image plane positions stored, such that the statistical processing by the adjusted drive amount calculation section is performed with a recent data set.

In yet another embodiment of the invention, a focus adjustment device comprises a focus detecting section for repeatedly detecting a defocus amount; a storing section for storing a plurality of defocus amounts detected by said focus detecting section; an image plane position calculation section for calculating a plurality of image plane positions based on the plurality of defocus amounts stored by the storing section; a drive amount calculation section for calculating a drive amount based on the image plane positions calculated by the image plane position calculation section; an adjusted drive amount calculation section for calculating an adjusted drive amount by statistically processing the plurality of image plane positions calculated by the image plane position calculation section; a statistical processing determination section for determining whether statistical processing of the plurality of image plane positions by the adjusted drive amount calculation section is appropriate; and a control section for controlling driving of the photographic lens based on the adjusted drive amount calculated by the adjusted drive amount calculation section when statistical processing of the plurality of image plane positions is determined to be appropriate by the statistical processing determination section.

In accordance with still another embodiment of the invention, there is provided a focus adjustment device for focusing a photographic lens in a camera comprising a focus detecting section for repeatedly detecting a defocus amount; a storing section for storing a plurality of defocus amounts detected by the focus detecting section; a drive amount calculation section for calculating a drive amount based on the defocus amount detected by the focus detecting section; an image plane position calculation section for calculating a plurality of image plane positions based on the plurality of defocus amounts stored by the storing section; an adjusted drive amount calculation section for calculating an adjusted drive amount by statistically processing the plurality of image plane positions calculated by the image plane position calculation section; and a control section for controlling driving of the photographic lens based on the drive amount calculated by the drive amount calculation section prior to a shutter release operation, the control section not driving the photographic lens until a magnitude of the defocus amount exceeds a predetermined value after an in-focus state has been determined based on the detected defocus amount prior to the shutter release operation; and for controlling driving the photographic lens based on the adjusted drive amount calculated by said adjusted drive amount calculation section when the shutter release operation occurs.

Normally, a first predetermined value is set in a narrow range close to 0 (e.g., ±50 microns). When auto focussing is started upon the release button being depressed halfway, the lens is driven based on the defocus amounts that have been calculated, and a determination is made that the in-focus state has been reached when the computed defocus amount is less than or equal to the first predetermined value, whereupon the lens is halted. Following this, even when the defocus amount that is computed exceeds the first predetermined value due to electrical noise or the like, for example, if the defocus amount is 80 microns, lens driving is not conducted if the defocus amount is less than or equal to a second predetermined value. The second predetermined value is set in a wider range (e.g., ±150 microns). Through this, hunting is prevented after the lens is initially focussed.

Furthermore, when the defocus amount that is generated exceeds the second predetermined value, because there is a large likelihood that this is not caused by noise or the like but rather because the object has moved or the photographer has moved the camera and changed the target object, the lens is moved by the defocus amount. When the defocus amount generated during this is within the range of the first predetermined value, the determination is that the in-focus position has again been reached, and driving is halted. In continuous mode, this is repeated. The second predetermined value of a wide-in-focus point range (width IF) is set in order to prevent hunting. The first predetermined value, however, may also be set as the same wide value of the second predetermined value (e.g., ±150 microns).

It therefore becomes possible to prevent hunting following the focussing of the lens by thus widening the second predetermined value (e.g., ±150 microns), but as a result there is the possibility that a slightly out of focus photograph will result when an exposure is conducted. Accordingly, it is necessary to set a more accurate in-focus point position when film exposure commences following the complete depression of the shutter member.

In order to achieve a sharply focussed picture following complete depression, the above embodiments can be used to refine the focus state of the camera.

In the first embodiment, an adjusted drive amount calculation section is provided, statistical processing is conducted to average the defocus amounts from a plurality (usually four or more) of defocus amounts stored prior to shutter release (complete depression), and the lens is driven by the adjusted drive amount obtained using the statistical processing that starts immediately after complete depression of the release until the exposure is conducted. As a result, photographs result in which the focus is accurate at the time of exposure.

With the third embodiment, immediately after the shutter release is completely depressed, lens driving is conducted based on the image plane position rather than the defocus amount, using a regression line derived from a plurality of image plane positions (usually four or more) calculated immediately prior to the shutter release, thereby minimizing the detection error caused by electric noise or the like. The position where the image plane should be at the time of exposure is predicted, and the necessary lens driving is then conducted during the interval from immediately after the shutter release is completely depressed until the exposure is conducted. Because photographs that are in focus can be taken even when the object is approaching or receding in the direction of the photographer, the third embodiment is more effective than the first embodiment.

The second embodiment is used when the object is moving initially and the image plane is constantly changing. Also, the camera can always detect the image plane velocity, and the differentiation of usage is such that the second embodiment is used when the magnitude of the image plane velocity is larger than a third predetermined value.

BRIEF DESCRIPTION OF DRAWINGS

The invention will be described in conjunction with the following drawings in which like reference numerals designate like elements and wherein.

DETAILED DESCRIPTION OF PREFERRED EMBODIMENTS

Figure 1:
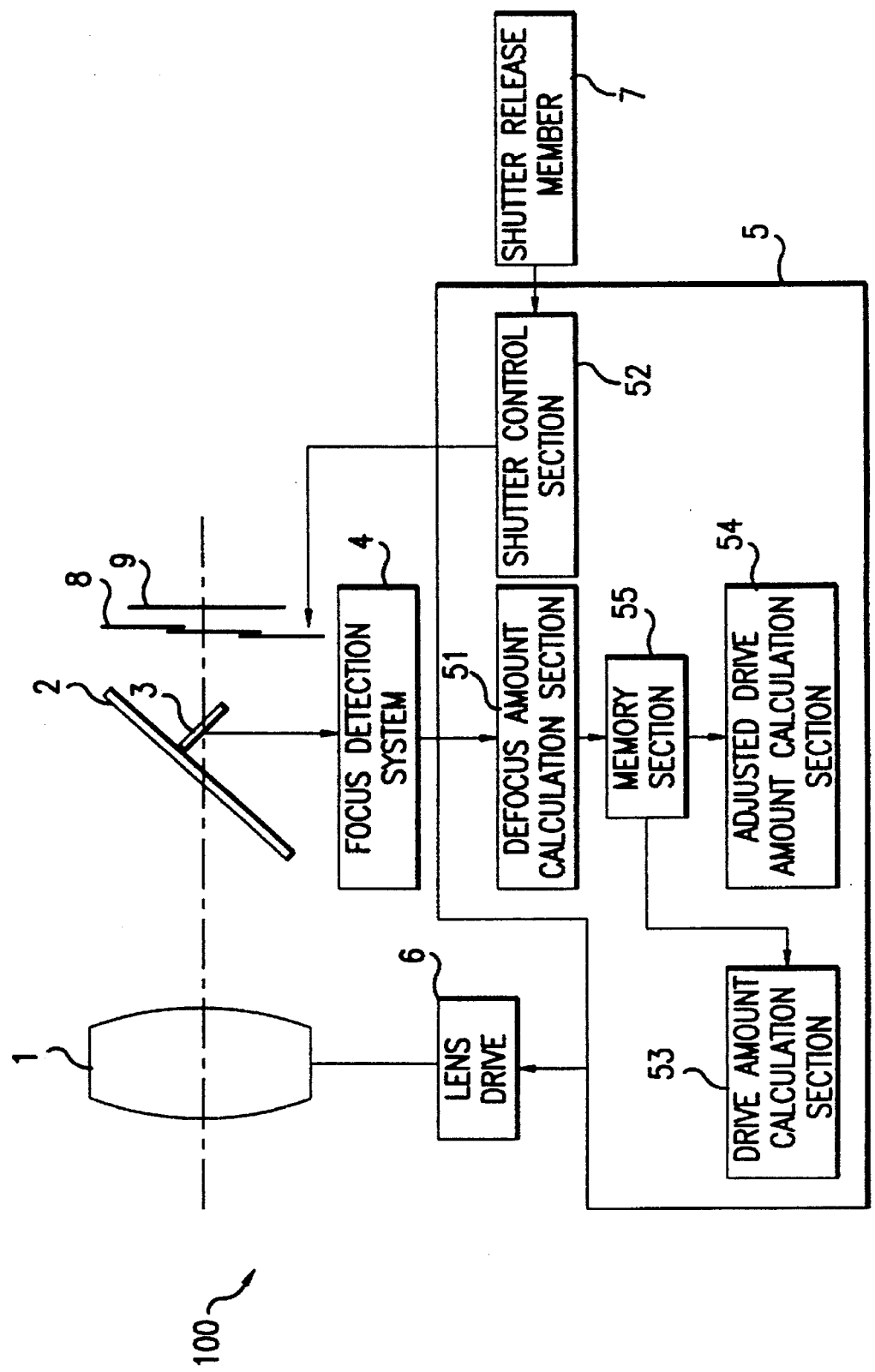
FIG. 1 is a functional block diagram that shows the composition of a camera having a focus adjustment device embodying the invention.

FIG. 1 is a block diagram that shows the construction of a camera comprising a focus adjustment device 100 according to a first embodiment of the invention. Light rays reflected from a photographic object pass through a photographic lens 1 and a half-mirror 2, are reflected by the submirror 3, and are guided to a focus detection system 4.

The focus detection system 4 includes a focus detection optical system (not shown) and an electric charge accumulation type image sensor. A set of images of the photographic object is created on the image sensor using the focus detection optical system, and a photographic object image signal is output corresponding to the optical strength of the set of photographic object images. Based upon the photographic object image signal, a focus detection calculation is performed by calculating a defocus amount that indicates the focus adjustment state of the photographic lens 1.

A controller 5 comprises a defocus amount calculation or determination section 51 that is operated by, for example, software in a microcomputer, a shutter control section 52, a drive amount calculation or determination section 53, an adjusted drive amount calculation or determination section 54, and a memory section 55.

The defocus amount calculation section 51 repeatedly performs focus detection by detecting a defocus amount based on the photographic object image signal input from the focus detection system 4. The memory section 55 stores the detected defocus amount. The drive amount calculation section 53 calculates or derives a drive amount for focusing the photographic lens 1 based on the most recently detected defocus amount. The controller 5 drives the lens drive 6 of the photographic lens 1 based on the calculated drive amount. Lens driving is halted if the magnitude of the defocus amount repeatedly detected is less than or equal to the first predetermined value (e.g., ±50 microns). Even if the detected defocus amount following halting exceeds the first predetermined value, the lens is not driven if the next defocus amount is less than a second predetermined value that is larger than the first predetermined value (e.g., ±150 microns). If the magnitude of the detected defocus amount exceeds the second predetermined value, lens driving is conducted on the basis of that defocus amount. The above is the continuous AF action prior to complete depressing of the release. The adjusted drive amount calculation section 54 statistically processes the plurality of defocus amounts stored in memory section 55 and calculates or derives an adjusted drive amount to properly focus the photographic lens 1 on a non-moving photographic object.

If shutter release member 7 is depressed completely, then the photographic lens 1 is driven according to the adjusted drive amount calculated or derived by the adjusted drive amount calculation section 54. Then, shutter 8 is drivingly controlled by the shutter control section 52 and exposure of the film 9 takes place following a predetermined period of time.

Figure 2:
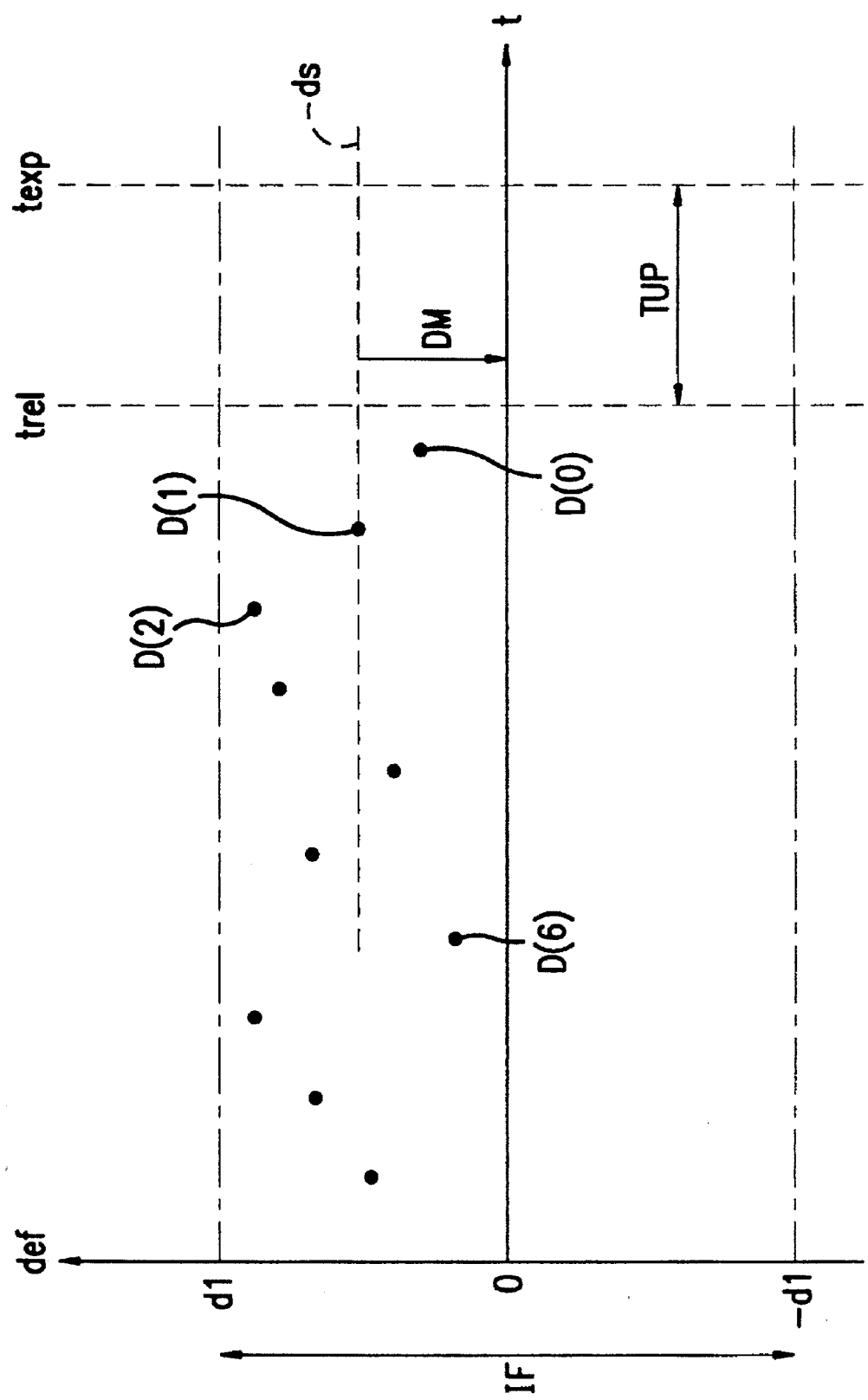
FIG. 2 is a diagram that shows the detected defocus amount following the focusing of the photographic lens on a non-moving photographic object.

FIG. 2 shows the defocus amounts $D(0), \ldots, D(6)$ detected by the focus detection system 4 following the determination of an in-focus state of the photographic lens 1 on a non-moving photographic object. If the defocus amount detected following the driving of the photographic lens 1 falls within a first predetermined limit, then the photographic lens 1 is in an in-focus state. Once an in-focus state has been determined, the photographic lens 1 is not driven until the detected defocus amount exceeds a second predetermined limit, i.e., the standard parameters (+d1—−d1). If the photographic lens 1 were driven each time a defocus amount is detected, then the photographic lens 1 would ordinarily be driven in a "hunting" state with a loss of sensitivity.

However, as shown in FIG. 2 the photographic lens 1 will not be driven following the determination of an in-focus state because the most recent detected defocus amount $D(0)$ falls within the standard parameters (+d1—−d1). However, the average of the plurality of defocus amounts, denoted as ds, often deviates from the true position of focus, denoted as 0, because of a focus error (DM). When a shutter release (complete depression) occurs, the shutter control section 52 controls the half-mirror 2 and the submirror 3 to draw away from the photographic object-to-film light path. After a specified period of time (TUP), the shutter control section 52 causes the shutter 8 to open and expose the film 9.

However, the camera is not sharply focused because the most recent defocus amount $D(0)$ is within the standard parameters (+d1—−d1). As a result, when a shutter release occurs, the focus error (DM) causes the resultant photograph to be slightly blurred. Thus, to produce a photograph that is sharply focused, it is necessary to correct the focus error DM.

To correct the focus error DM, the adjusted drive amount calculation section 54 statistically processes a plurality of defocus amounts and calculates an adjusted drive amount.

A determination is made by the adjusted drive amount calculation section 54 as to whether statistical processing of the defocus amount $D(i)$ is appropriate relative to the non-moving photographic object based on the detected defocus amounts $D(i)$ $(i=0,1,2, \ldots, N-1)$.

Several methods for determining whether statistical processing is appropriate are as follows:

(1) If each of a number N of defocus amounts $D(i)$, $(i=0,1,2, \ldots, N-1)$ satisfies the condition $-Ytobi<D(i)<Ytobi$, where $\pm Ytobi$ are predetermined limits, then statistical processing can be performed based on the defocus amounts $D(i)$.

(2) If the range of deviation of a number N of defocus amounts $D(i)$, $(i=0,1,2, \ldots, N-1)$ satisfies the condition MAX $[D(i)]$–MIN $[D(i)]<$(predetermined value), then statistical processing can be performed based on the defocus amounts $D(i)$.

(3) If the sum of the absolute value of the difference between defocus amounts for a number N of defocus amounts $D(i)$, $(i=0,1,2, \ldots, N-1)$ satisfies the condition $\Sigma|D(i)-D(i+1)|<$(predetermined value), then statistical processing can be performed based on the defocus amounts $D(i)$.

(4) If the maximum absolute value of the difference between defocus amounts for a number N of defocus amounts $D(i)$, $(i=0,1,2, \ldots, N-1)$ satisfies the condition MAX $[D(i)-D(i+1)]<$(predetermined value), then statistical processing can be performed based on the defocus amounts $D(i)$.

(5) If the dispersion of $D(i)$ satisfies the condition $\sqrt{\{D(i)-D(i-1)\}^2/(N-1)}<$(predetermined value), then statistical processing can be performed based on the defocus amounts $D(i)$.

However, it should be appreciated that the method for determining the appropriateness, or lack thereof, of statistical processing is not limited to the methods described above. The above predetermined values are selected according to the particular camera being used and are advantageously derived through empirical testing techniques.

Whatever method is used, if a determination is made that statistical processing is appropriate, then the adjusted drive amount DM is calculated or derived by the adjusted drive amount calculation section 54. When a shutter release (complete depression) occurs, the adjusted drive amount is determined using the most recent defocus amount D(0), and the past three defocus amounts D(1), D(2) and D(3) stored in memory section 55, to calculate an average value using the following equation:

$$DM=(D(0)+D(1)+D(2)+D(3))/4 \quad (1)$$

Although the average of the four defocus amounts D(0), ..., D(3) is used to determine the adjusted drive amount DM, it should be appreciated that the number of previous defocus amounts is not limited to four. However, it is desirable that the average is determined from at least four defocus amounts because the focus amount error can be cut in half when compared to using only one defocus amount.

If the adjusted drive amount DM is calculated, then the controller 5 drives the photographic lens 1 by the adjusted drive amount DM using the lens drive 6. Because the adjusted drive amount DM is small, driving of the photographic lens 1 is completed after a shutter release (complete depression) occurs and before film exposure.

Following a determination that statistical processing is appropriate, the photographic lens 1 may be driven according to the adjusted drive amount at the following points in time:

(1) Following initial focusing, an adjusted drive amount is calculated following each specified period of time, and the lens is driven based on the calculated amount;

(2) Following initial focusing, and after a fixed number of calculations of the defocus amount, an adjusted drive amount is calculated, and the photographic lens 1 is driven accordingly; and (3) Immediately following the release of the shutter 8 by the shutter release member 7 (complete depression), an adjusted drive amount is calculated, and the photographic lens 1 is driven accordingly.

An example is provided according to number (3) above because driving the photographic lens 1 immediately before film exposure is most appropriate. However, it should be understood that the adjusted drive amount may be calculated, and the photographic lens 1 may be driven at other points in time.

In the first embodiment, an explanation was provided in which calculation of the lens drive amount is based on the detected defocus amounts. However, when the photographic object is moving with respect to the camera, such a method may prove to be inadequate.

Figure 3:
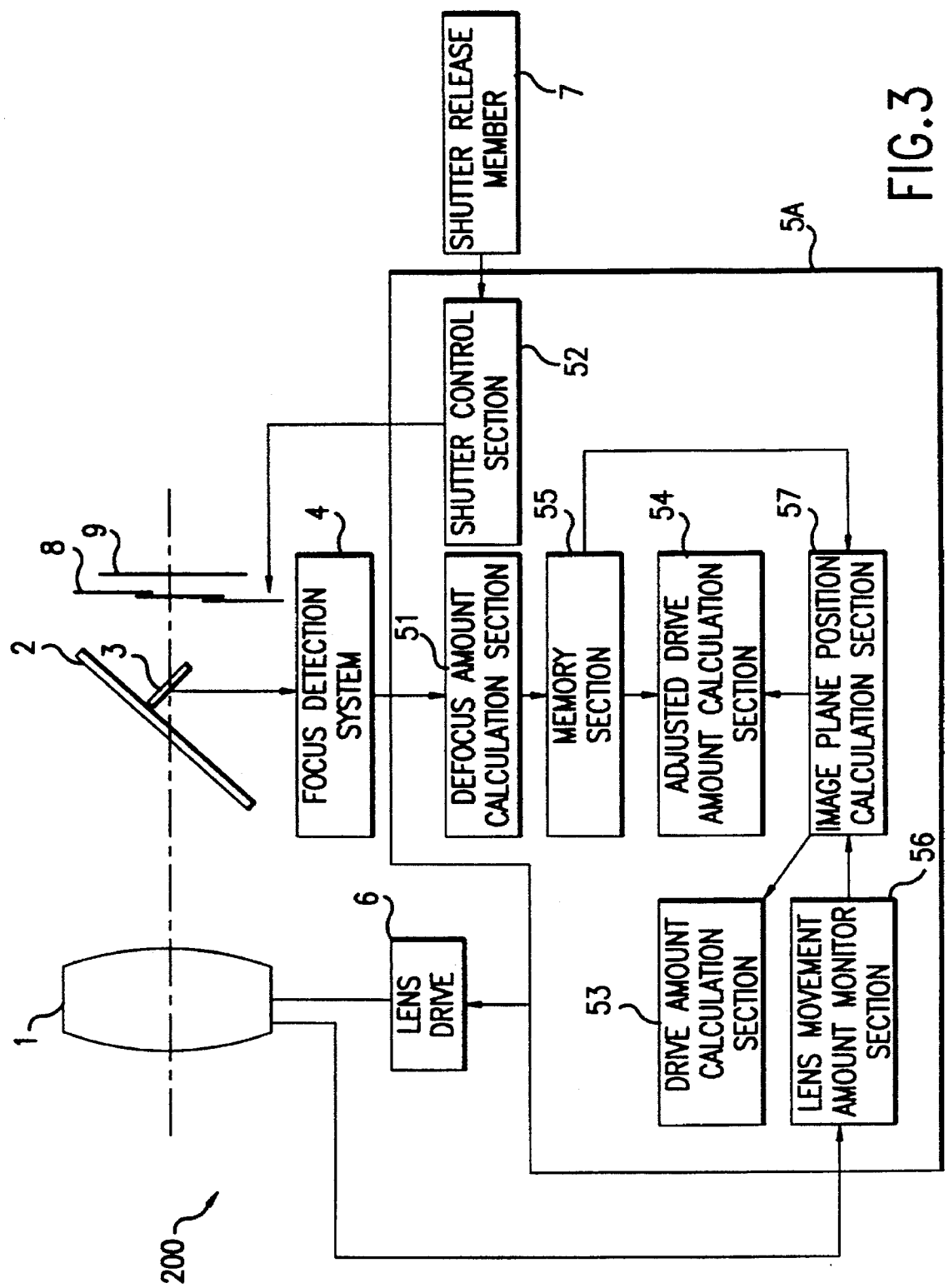
FIG. 3 is a functional block diagram that shows the composition of a camera having a focus adjustment device embodying the invention.

FIG. 3 is a functional block diagram showing a camera equipped with a focus adjustment device 200 according to a second embodiment of the invention. In the second embodiment, a subject image plane position is obtained from the detected defocus amount and previous lens movement amounts required to calculate a lens drive amount to avoid an unstable focus state of the camera. Like reference numerals are used for like reference components described in the first embodiment, and therefore, explanation of the previously described components will not be repeated for convenience.

The lens movement amount monitor section 56 monitors the movement amount of the photographic lens 1 and stores 1) the amount of lens movement at each of the times corresponding to the accumulation starting time of the electric charge accumulation type image sensor; 2) the accumulation ending time; 3) the central point of the accumulation time; and 4) the time of completion of the focus detection operation. Hereafter, the time of the central point of the accumulation time will be referred to as the accumulation time. The lens position at the accumulation time is the central point of the lens position at the accumulation starting time and the accumulation ending time.

The image plane position calculation or determination section 57 calculates or derives the image plane position at specified times based on the defocus amounts stored in memory section 55 and the lens movement amounts for each time period stored in the lens movement amount monitor section 56. Furthermore, each focus detection cycle includes an electric charge accumulation operation, and a focus detection operation. Driving of the photographic lens 1 may be accomplished either in parallel with, or upon the completion of, each focus detection cycle. When a shutter release (complete depression) occurs and the half-mirror 2 is up, the film is exposed.

The drive amount calculation section 53 calculates a straight line from at least two image plane positions as a function of time or calculates a curved line from at least three image plane positions as a function of time.

Based on the straight line or the curved line, an estimation of the image plane position at some future time, e.g. at the time of film exposure, is obtained. In addition, the movement amount from the current position to a projected future image plane position is calculated. Thus, the movement amount for moving the photographic lens 1 is calculated to track a moving photographic object.

The adjusted drive amount calculation section 54 obtains the image plane position at some future time (such as the time of film exposure) from the multiple image plane positions calculated by the image plane position calculation section 57. By using regression analysis to calculate a straight line or a curved line as a function of time of the image plane positions, an extrapolation or projection is performed to obtain an adjusted drive amount required to accurately focus the photographic lens 1 on a moving photographic object at the time of film exposure. Straight line regression should be calculated with at least three image plane positions, and preferably with at least four image plane positions. Curved line regression should be calculated with at least four image plane positions.

The lens drive 6 drives the photographic lens 1 according to the drive amount calculated by the drive amount calculation section 53 until the shutter release member 7 completes the release operation (complete depression) of the shutter 8. Once the shutter release member 7 performs the release operation, then the photographic lens 1 is driven according to the adjusted drive amount calculated by the adjusted drive amount calculation section 54.

The image plane movement amount P(tn) that accompanies the movement of the photographic object between the accumulated time, tn, and a past accumulated time, tm, is as follows:

$$P(tn)=D(tn)+M(tn)-D(tm) \quad (2)$$

Here, D(tn) represents the defocus amount for the time tn; D(tm) represents the defocus amount for the time tm; and M(tn) represents the amount of lens movement (the amount of image plane movement based upon the amount of lens movement). In this case, the conversion coefficient is 1 from the time tm to the time tn. If counting is achieved according to the chronology t0, t1, t2, from the most recently accumulated time, then the image plane movement amount P(0), P(1), P(2), etc. within each of the accumulated time periods {t0~t1, t1~t2, t2~t3, ... } is as follows:

$$P(0) = D(0) + M(0) - D(1)$$

$$P(1) = D(1) + M(1) - D(2) \quad (3)$$

$$P(2) = D(2) + M(2) - D(3)$$

$$P(3) = D(3) + M(3) - D(4)$$

The image plane positions x(0), x(1), x(2), x(3), etc. at each of the times t0, t1, t2, t3 ... that comprise the source points of the lens position S (in FIG. 4) at the time t0 become:

$$\begin{aligned} x(0) &= D(0) \\ x(1) &= x(0) - P(0) = D(1) - \{M(0)\} \\ x(2) &= x(1) - P(1) = D(2) - \{M(0) + M(1)\} \\ x(3) &= x(2) - P(2) = D(3) - \{M(0) + M(1) + M(2)\} \end{aligned} \quad (4)$$

If required, a correction is performed by multiplying the coefficient for converting the lens drive amount M(tn) to the image plane movement amount P(tn) when the coefficient is other than 1.

Next, a determination is made by the adjusted drive amount calculation section 54 as to whether statistical processing is appropriate for the image plane position x(i) relative to the moving photographic object based upon the image plane position x(i),(i=0,1,2,3, ... , N-1).

Several methods for determining whether statistical processing is appropriate include:

(1) If the difference of each image plane position from the average value of a number N of the image plane positions x(i),(i=0,1,2,..., N-1) satisfies the condition -Ytobi<{x(i)-X0}<Ytobi, where ±Ytobi are predetermined limits, then no image plane jump has occurred (i.e. no significant change in image plane position has occurred), and statistical processing of image plane positions can be performed. In this instance, X0 represents the average value of x(i),(i=0,1,2,..., N-1), or a value determined by an appropriate method.

(2) If the range of deviation of a number N of image plane positions x(i),(i=0,1,2,..., N-1) satisfies the condition MAX[x(i)]-MIN[x(i)]<(predetermined value), then no image plane jump has occurred. Statistical processing can be performed based of the image plane positions x(i),(i=0,1,2, ... , N-1).

(3) If the absolute value of each of a number N of image plane movement amounts P(i),(i=0,1,2, ... , N-1) satisfies the condition |P(i)|<(predetermined value), then no image plane jump has occurred. Statistical processing can be performed based on the image plane positions x(i),(i=0,1,2, ... , N-1).

(4) If the sum of the absolute value of a number N of image plane movement amounts P(i),(i=0,1,2, ... , N-1) satisfies the condition Σ|P(i)|<(predetermined value), then no image plane jump has occurred. Statistical processing can be performed based on the image plane positions x(i),(i=0,1,2, ... , N-1).

Furthermore, in order to make a more refined determination, an amount relating to the distance an image plane position is from the straight line may be used to determine whether there has been an image plane jump.

(5) If the deviation from the straight line satisfies the condition Σ|P(i)|-|V$_{rp}$·/{t(0)-t(N-1)}|<(predetermined value), then statistical processing can be performed. In this instance, the Σ shows the total sum of P(i), (i=0,1,2, ... , N<1).

(6) If the range of deviation of the number N of image plane movement amounts P(i),(i=0,1,2, ... , N-1) satisfies the condition Max[P(i)]-Min[P(i)]< (predetermined value), then statistical processing can be performed.

(7) The amount of dispersion of P(i) can be compared with a specified value to determine whether statistical processing is appropriate. For example, if the dispersion of P(i) is less than a specified value, statistical processing can be performed. Furthermore, the amount of dispersion can be replaced with the representative value of the absolute value of P(i) (|P(i)|) or the average value of P(i).

The image plane movement velocity v(i), which is the image plane position divided by a time interval, may be used instead of P(i) in the above equations.

It should be appreciated that the method for determining the appropriateness, or lack thereof, of statistical processing is not limited to the methods described above. The above predetermined values are selected according to the particular camera being used and are advantageously derived through empirical testing techniques.

Whatever method is used, if a determination is made that statistical processing is appropriate, then the adjusted drive amount DM is calculated by the adjusted drive amount calculation section 54.

Figure 4:
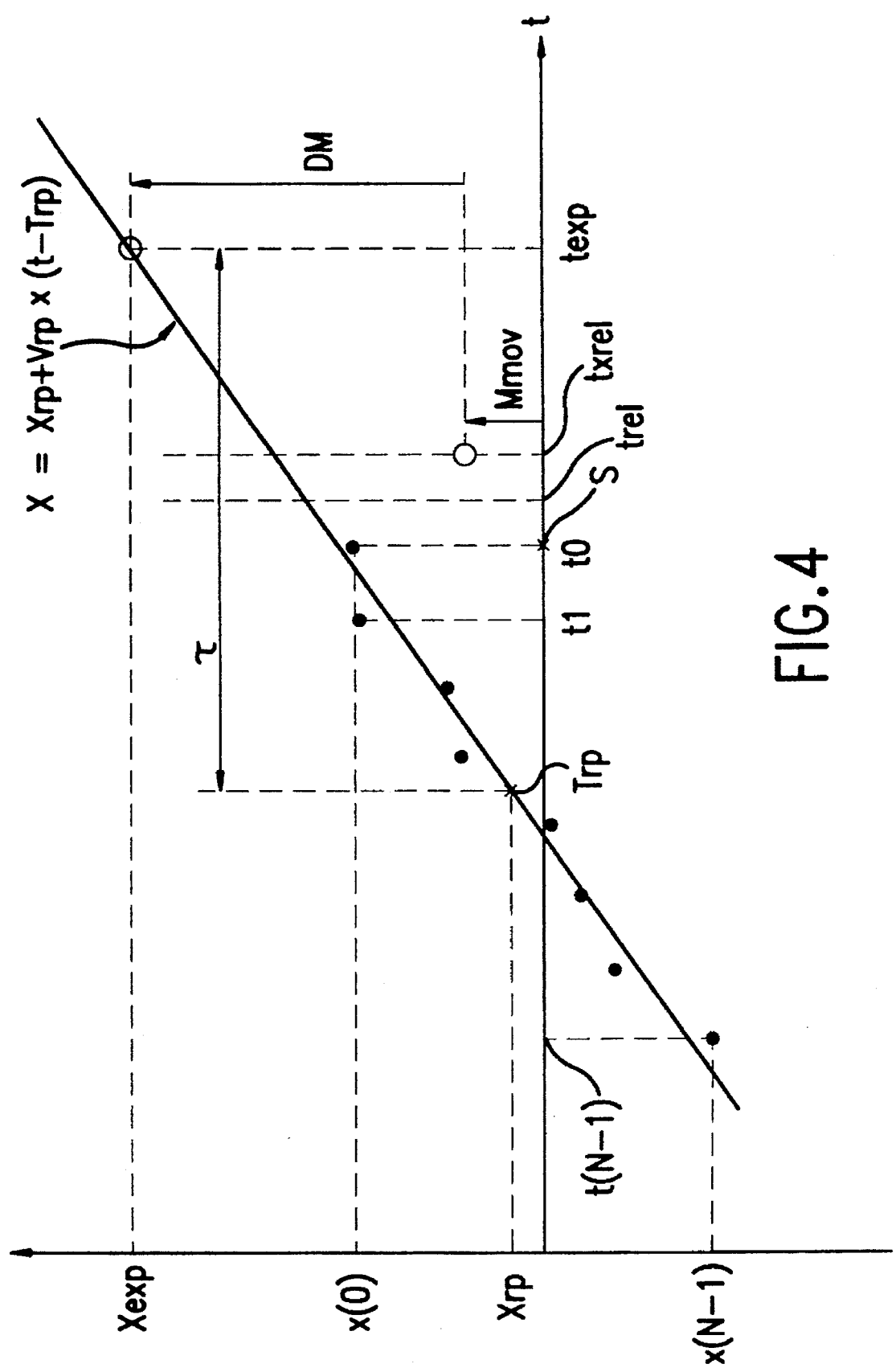
FIG. 4 is a diagram that shows the image plane positions caused by a moving photographic object.

FIG. 4 shows the image plane positions x(t) caused by a moving photographic object. The photographic lens 1 is shown to be at a lens position S at time t0. In this embodiment, the adjusted drive amount DM can be obtained as follows:

First, the image plane velocity, V$_{rp}$, the average image plane position, X$_{rp}$, and the average time, T$_{rp}$, are obtained.

The average time, T$_{rp}$, is obtained as the average time of a number N of times t(i),(i=0,1,2, ... , N-1) according to the following equation:

$$T_{rp} = (t(0) + t(1) + t(2) + \ldots + t(N-1))/N \quad (5)$$

The average image plane position, X$_{rp}$, is obtained as the average image plane position of a number N of image plane positions x(i),(i=0,1,2, ... , N-1) according to the following equation:

$$X_{rp} = (x(0) + x(1) + x(2) + \ldots + x(N-1))/N \quad (6)$$

The image plane velocity, V$_{rp}$, is obtained as a slope of the straight line wherein the root mean square (RMS) errors for each of the image plane positions shown in FIGS. (5a) and 5(b) are minimized according to the following formula:

$$V_{rp} = \frac{\Sigma[\{x(i) - x_{rp}\} \cdot \{t(i) - T_{rp}\}]}{\Sigma\{t(i) - T_{rp}\}^2} \quad (7)$$

According to Equations 5-7, the straight line is described as:

$$X = X_{rp} + V_{rp} \cdot (t - T_{rp}) \quad (8)$$

Calculation of the image plane velocity, V$_{rp}$, the average image plane position, X$_{rp}$, and the average time, T$_{rp}$, is performed at the point in time at which the focus detection operation is terminated in each of the focus detection cycles. However, it may also be calculated immediately following shutter release to be more efficient. As a result, the image plane position, X$_{exp}$, at the time of film exposure, T$_{exp}$, is calculated based on the time period from the average time, $T_{rp}$, to the projected time of film exposure, $Tex_{exp}$. The difference from the average time, $T_{rp}$, and the projected time of film exposure, $T_{exp}$, is the time $\gamma$. The image plane position, $X_{rp}$, and the image plane velocity, $V_{rp}$, are derived according to the following equation:

$$X_{exp}=X_{rp}+V_{rp}\cdot\gamma \qquad (9)$$

Because the lens position is S at the time t0, the amount of movement, $M_{mov}$, of the photographic lens 1 is measured from the time t0 to the time of film exposure $T_{exp}$. Then, the adjusted drive amount DM can be obtained according to the following equation:

$$DM=X_{exp}-M_{mov} \qquad (10)$$

If the adjusted drive amount, DM, is calculated, then the controller 5 moves the photographic lens 1 by the adjusted drive amount DM using the lens drive 6.

Of course, if the image plane movement amount and the lens drive amount do not correspond in a one-to-one ratio, then the controller 5 correctly drives the photographic lens 1 by the lens drive amount using a conversion coefficient.

According to the second embodiment of the invention, because a large amount of data can be statistically processed to estimate the image plane position immediately prior to film exposure, the amount of error in the estimation becomes small. Because the magnitude of the adjusted drive amount is small, adjustment of the photographic lens focus position is completed during the mirror-up operation and before the film is exposed. Therefore, the photographic lens 1 is driven to a precise focus position, $X_{exp}$, and an accurately focused photographic result is obtained at the time of film exposure.

Furthermore, when the drive amount calculations are performed at the end of a focus detection operation, a determination is made as to whether statistical processing is appropriate. If appropriate, then after an appropriate period of time (20–200 ms) from the end of the focus detection operation, a projected time for film exposure is estimated and statistical processing is performed in the manner described above, after which the photographic lens 1 is driven by the adjusted drive amount before film exposure takes place.

Figure 6:
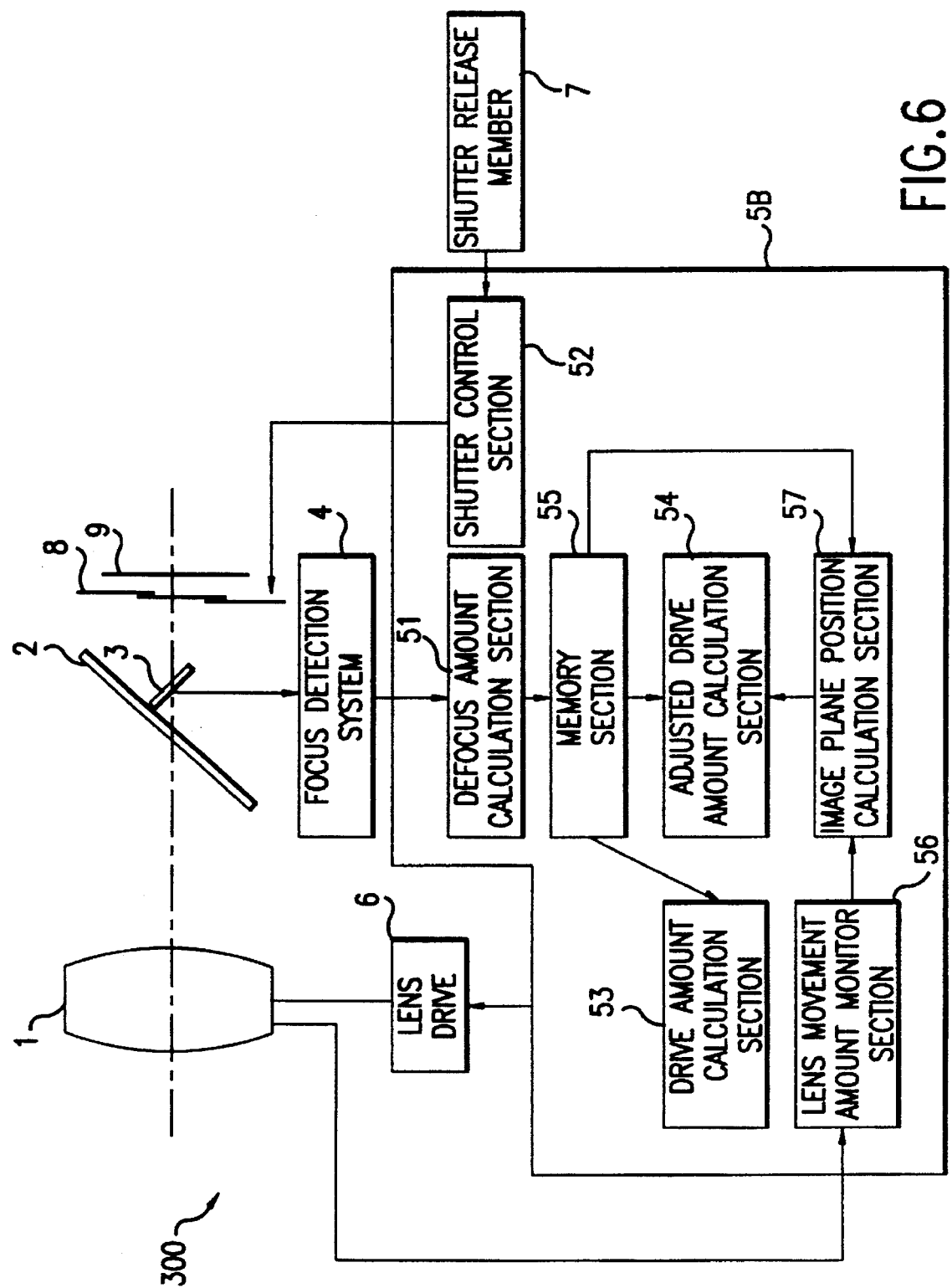
FIG. 6 is a functional block diagram that shows the composition of a camera having a focus adjustment device embodying the invention.

FIG. 6 is a functional block diagram showing the composition of a camera that includes a focus adjustment device 300 according to a third embodiment of the invention. In the third embodiment, movement of the photographic object causes slight movements of the image plane position. Like reference numerals are used for like reference components described in the first and second embodiments, and therefore, explanation of the previously described components and will not be repeated for convenience.

The drive amount calculation section 53 uses the defocus amount to calculate the drive amount as in the first embodiment, and the adjusted drive amount calculation section 54 uses the image plane position to calculate the drive amount as in the second embodiment.

The lens movement amount monitor section 56 monitors the movement amount of the photographic lens 1 and stores 1) the accumulation commencement time of the electric charge accumulation type image sensor; 2) the accumulation completion time; 3) the central point of the accumulation time; and 4) the completion time of the focus detection operation. Hereafter, the time of the central point of the accumulation time will be referred to as the accumulation time. The lens position at the accumulation time is the central point of the lens position at the accumulation starting time and the accumulation ending time.

The image plane position calculation section 57 calculates the image plane position based on the defocus amounts stored in memory section 55 and the lens movement amounts stored in the lens movement amount monitor section 56. Furthermore, the focus detection cycle includes an electric charge accumulation operation and a focus detection operation. Driving of the photographic lens 1 may be accomplished either in parallel with, or upon the completion of, each focus detection cycle. Upon release (complete depression) of the shutter release member 7, and once the half-mirror 2 is up, film exposure is accomplished.

The drive amount calculation section 53 calculates the drive amount based on a defocus amount calculated by the defocus amount calculation section 51. If the magnitude of the defocus amount is less than the first predetermined limit, then the controller 5B determines that an in-focus state has been accomplished and the photographic lens 1 is not driven again until the defocus amount exceeds the second predetermined limit.

In the third embodiment, until a shutter release (complete depression) occurs, the drive amount of the photographic lens 1 is substantially the same as that of the first embodiment.

Figure 5A:
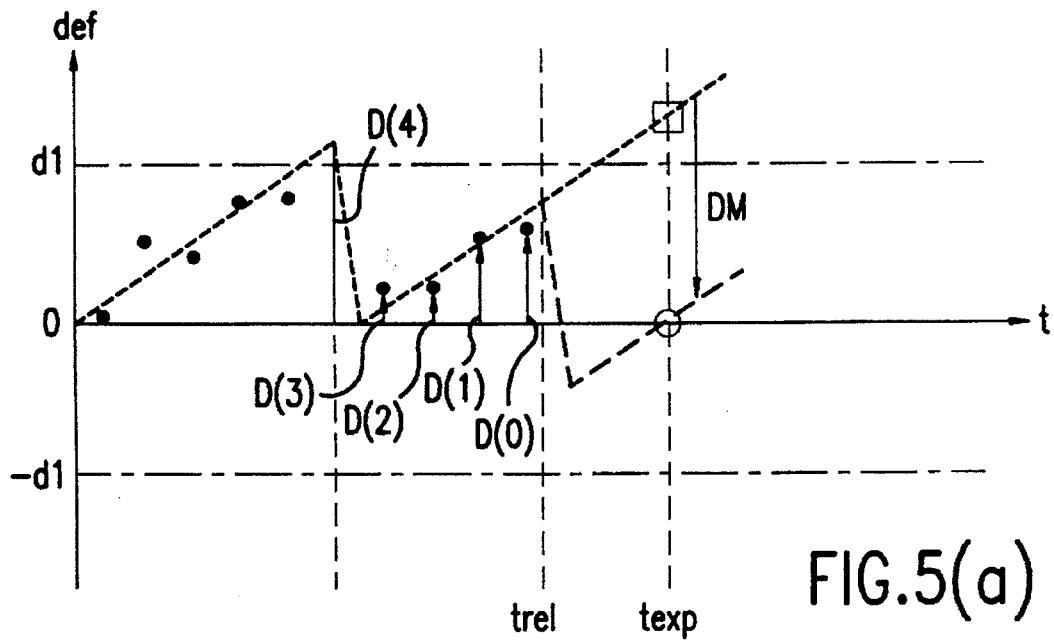
FIG. 5(a) is a diagram that shows the defocus amounts caused by a moving photographic object, and the photographic lens tracking the moving photographic object.

However, as shown in FIG. 5(A), where the vertical axis represents the defocus amount, when the photographic object approaches from a distance, the image plane movement velocity is initially small and the calculated defocus amount changes.

During the period of time when the defocus amount is repeatedly calculated, the movement of the image plane produces a defocus amount D(4) that exceeds a second predetermined limit. The controller 5B then controls the lens drive 6 to drive the photographic lens 1 and correct the defocus amount D(4). During the next moment, the defocus amount is zero (0). However, because the image plane position is gradually moving, the error in the defocus amount is no longer zero (0) and gradually increases.

As shown in FIG. 5(A), if a shutter release (complete depression) occurs at time, $T_{rel}$, then the time of film exposure, $T_{exp}$, takes place following a specified time period, TUP. At time $T_{rel}$, the most recent defocus amount D(0) is within the standard parameters (+d1 to −d1) and an in-focus state of the photographic lens 1 exists. However, because there is continued movement of the image plane position, exposure of the film at $Tex_{exp}$ will result in a slightly blurred photographic picture because of the focus error (DM) shown as the □ (clear box) in FIG. 5(A).

Hence, when a shutter release occurs, it is necessary to correct the predicted focus error DM of FIG. 5(A) due to the movement of the photographic object. In order to correct the DM, more than just the defocus amount must be considered. To accurately focus the camera, a direct examination of the image plane position must be made.

Figure 5B:
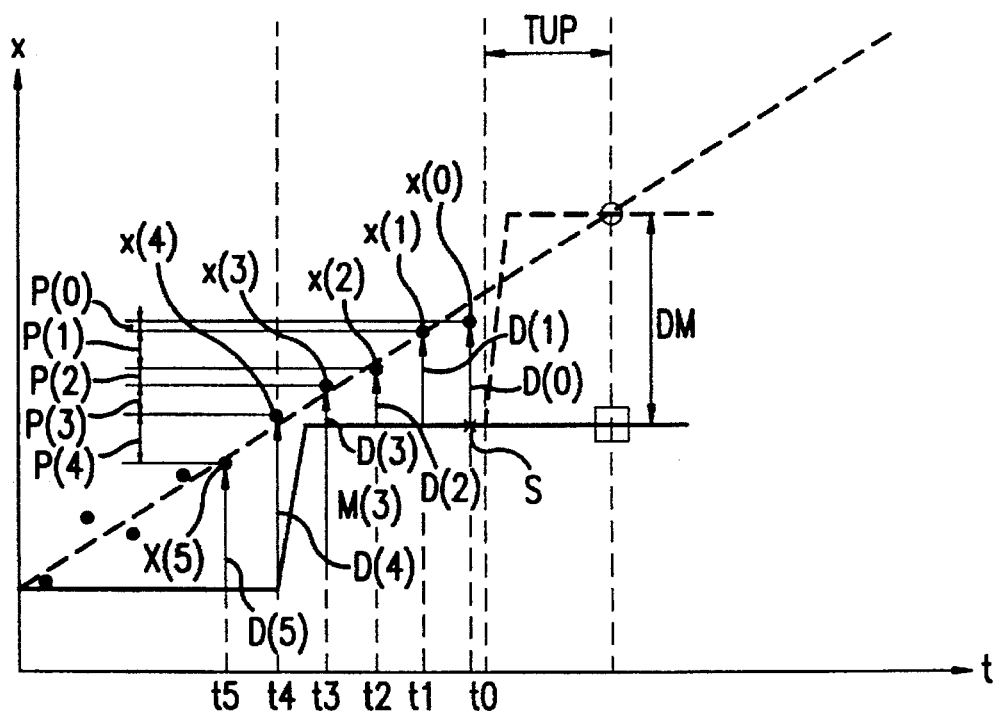
FIG. 5(b) is a diagram that shows the image plane movements caused by a moving photographic object.

As shown in FIG. 5(B), the changes in the image plane positions appear as the vertical axis and are similar to FIG. 4. Thus, the explanation when a shutter release occurs is similar to the explanation provided for the second embodiment shown in FIG. 4. Therefore, the following discussion is abbreviated.

Up to now, when statistical processing for each of the embodiments is determined to be inappropriate, then statistical processing is not performed. However, statistical processing can be further refined. Regarding the first embodiment, defocus amounts D(i) that fall outside of the standard parameters (+d1—−d1) (i.e., the first predetermined limit) can be rejected as exceptional data. By selecting appropriate data that are within the standard parameters (+d1 to −d1) and rejecting exceptional data, unnecessary storage of defocus amount can be avoided. Regarding the second embodiment, the image plane movement, P(i), that falls outside and above the predetermined limit derived from an average also becomes exceptional data. By rejecting exceptional data (jumped data), statistical processing may be more accurately performed.

In addition, if statistical processing is inappropriate and when the magnitude of the most recent defocus amount D(0) is less than the first predetermined limit of a photographic object jump, then the most recent defocus amount D(0) in the drive amount calculation section 53 is used for driving the photographic lens 1.

Furthermore, the number of data utilized in statistical processing may vary depending upon conditions. For example, if old data is used when there is a significant time gap between older data and newer data, then there is a corresponding loss in responsiveness and in focus adjustment precision. Therefore, the time parameters for data used in statistical processing should be restricted to satisfy the following expression to selectively update stored data.

$$\{t(0)-t(N-1)\}<(\text{predetermined time}) \qquad (11)$$

Thus, only the most recent stored data corresponding to an in-focus state of the photographic lens 1 are used in statistical processing.

In addition, the length of the time for storing defocus amounts (image plane positions) and/or a number of defocus amounts (image plane positions) stored should be limited or restricted such that statistical processing is performed with a recent set of defocus amounts (data points). For example, a time period can be established in which defocus amounts are considered for statistical processing. In addition or as an alternative, within each time period, a limited number of defocus amounts can be used for statistical processing.

According to the construction of the second land third embodiments, the focus detection system 4 and the defocus amount calculation section 51 comprise focus detection means; the drive amount calculation section 53 comprises drive amount calculation means; the controllers (5A and 5B) comprise drive control means, focus determination means, drive inhibiting means and statistical processing determination means; the adjusted drive amount calculation section 54 comprises adjusted drive amount calculation means; and the image plane position calculation section 57 comprises image plane position calculation means.

Next, an explanation is provided with respect to the apportionment of each embodiment in terms of use.

Each of the controllers (5, 5A and 5B) shown in FIGS. 1, 3, and 6 further includes movement discrimination means (not shown) that discriminates the presence, or lack thereof, of image plane movement accompanying the movement of a photographic object. For example, the movement discrimination means will discriminate image plane move-ment when the magnitude P(i) is within specified parameters or when the ratio of the magnitude of P(i) to P(i+1) is within specified parameters.

If it is determined that image plane movement exists, then the second embodiment will be used to focus the camera.

If it is determined that no image plane movement exists and the photographic object is entirely at rest, then the first embodiment will be used to focus the camera.

If slight amounts of image plane movement exist, then the third embodiment will be used to focus the camera. However, the third embodiment may apply even in the case when there is no image plane movement.

As described above, the controllers (5, 5A and 5B) include a movement discrimination means that may change the contents of the drive amount calculation section 53 or the adjusted drive amount calculation section 54. Thus, no matter what the condition, lens movement is stabilized to accurately focus the camera.

Further, the controllers 5, 5A and 5B can be implemented as a single special purpose integrated circuit (e.g., ASIC) having a main or central processor section for overall, system-level control, and separate sections dedicated to performing various different specific computations, functions and other processes under control of the central processor section.

It will be appreciated by those skilled in the art that the controllers 5, 5A and 5B can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). Each controller 5, 5A and 5B can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing a program of the invention can be used as the controllers 5, 5A and 5B. As shown in FIG. 1, a distributed processing architecture is preferred for maximum data/signal processing capability and speed.

As described above, detection of the defocus amount of the photographic lens 1 is repeatedly performed. Based on the current detected defocus amount, the drive amount required to focus the photographic lens 1 is calculated, and the photographic lens 1 is driven accordingly. Following the driving of the photographic lens 1 to achieve an in-focus state of the camera, the next detected defocus amount is compared with a first predetermined limit and a determination is made as to whether there is an in-focus state of the photographic lens 1. Following the determination of an in-focus state, the photographic lens 1 is not driven again until a defocus amount exceeds a second predetermined limit.

Also, following the in-focus state determination, the defocus amount is stored, a plurality of stored defocus amounts are statistically processed, and the adjusted drive amount is calculated to properly focus the photographic lens 1 on the photographic object at the time of film exposure. Because the photographic lens 1 is driven according to the adjusted drive amount when a shutter release occurs, sensitive reactions to small defocus amounts in the vicinity of the focus position are ignored, and unstable movements of the photographic lens 1 as it approaches the vicinity of the focus position are prevented. Meanwhile, when a shutter release occurs, the photographic lens 1 is driven by an adjusted drive amount to a position of precise focus.

Further, just prior to performing statistical processing, a determination is made as to the appropriateness, or lack thereof, of statistical processing of the plurality of detected defocus amounts. If appropriate, then statistical processing and calculation of an adjusted drive amount are performed.

In cases where the amount of movement of the image plane position caused by movement of the photographic object is large, then by using the image plane positions derived from the detected defocus amounts, the drive amount required to properly drive and focus the photographic lens 1 is calculated for tracking a moving photographic object. By statistically processing the calculated plurality of image plane positions, the adjusted drive amount is calculated to properly focus the photographic lens 1 on a moving photographic object at the time of film exposure.

Before a shutter release (complete depression) occurs, the photographic lens 1 is driven based on the calculated drive amount. When a shutter release occurs, the photographic lens 1 is driven based on the adjusted driving amount to an accurate focus position with respect to a moving photographic object and a properly focused photographic result is obtained at the time of film exposure.

In addition, just prior to performing statistical processing, a determination is made as to the appropriateness, or lack thereof, of statistical processing of the plurality of image plane positions. If determined to be appropriate, statistical processing is performed. If statistical processing is inappropriate, then statistical processing is not performed.

Also, in cases where the image plane movement is a small amount with respect to the movement of the photographic object before a shutter release (complete depression) occurs, driving of the photographic lens 1 is accomplished or inhibited based on the defocus amount. After a shutter release occurs, if statistical processing is appropriate, the image plane position at the time of film exposure is projected or predicted and the photographic lens 1 is driven accordingly. If statistical processing is inappropriate, the photographic lens 1 is driven based on the drive amount. As a result, unstable movements in the vicinity of the photographic lens focus position are prevented and a sharply focused photographic result is produced at the time of film exposure.

In addition, each of the embodiments may be implemented independently. Or, the embodiments may be used in a single camera and may be selected using an external switch or an operation member (driving mode selection).

When a plurality of the embodiments are used in combination, the combination is made by determining the absence or presence of image plane movement using the above described movement discrimination means. That is to say, the magnitude of the image plane movement velocity can be constantly detected, and usage of each embodiment depends on the detected image plane movement. The methods of usage include:

(1) When the first embodiment and second embodiment are used: The image plane movement velocity is constantly detected, and the second embodiment is used when the magnitude of the image plane movement velocity is larger than a predetermined value.

(2) When the third embodiment and second embodiment are used: The image plane movement velocity is constantly detected, and the second embodiment is used when the magnitude of the image plane movement velocity is larger than a predetermined value. The third embodiment is used (in place of the first embodiment) when the magnitude of the image plane movement velocity is small.

(3) When the first embodiment, second embodiment, and third embodiment are used: The second embodiment is used when the magnitude of the image plane movement velocity is larger than a predetermined value. The third embodiment is used when the image plane movement velocity is smaller than the predetermined value but the presence of image plane movement is clear and the determination is that this value can be found with accuracy. The first embodiment can be used when the image plane movement velocity cannot be found with accuracy, or when the image plane movement is insignificant.

Naturally, selection of each mode of operation should be made taking into consideration more minute conditions (such as gear backlash errors) and the like.

Moreover, the image plane movement velocity is used to determine whether the second or the third embodiment should be used to focus on the photographic object. The image plane velocity V(tn) can be calculated by dividing the image plane movement amount P(tn) (equation (2), above) by the time interval (tn–tm) as follows:

$$V(tn)=P(tn)/(tn-tm) \qquad (12)$$

The magnitude of the image plane velocity is continuously calculated each time the defocus amount is calculated. It is the most recommended usage that, when the size of the image plane velocity is smaller than the third specified value (for example, 1 mm/sec), the third embodiment (or the first embodiment) is used, and when the size of the image plane velocity is larger than the third specified value, the second embodiment is used.

However, each of the three embodiments, as mentioned, can be independently operated with good effectiveness. One common thread in all three embodiments is that the adjusted drive immediately before exposure makes it possible to shoot focussed pictures at the moment of film exposure by minimizing the electrical noise errors and the like via use of the respective statistical processing techniques. The statistical processing method differs between the three embodiments. For example, the first embodiment uses statistical techniques for determining the average of a plurality (normally four or more) of defocus amounts, and the second and the third embodiments each determine the linear regression for a plurality (normally four or more) of the image plane positions determined from the defocus amount and the lens drive amount. The second and the third embodiments each calculate the adjusted drive amount after complete depression until immediately before the exposure, using the linear regression for the plurality of the image plane positions. Thus, accurate focussing that eliminates the effect of the noise is reached at the time of the exposure.

While the invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A focus adjustment device for focusing a photographic lens in a camera, comprising:

focus detecting means for repeatedly detecting a defocus amount;

means for storing a plurality of defocus amounts detected by said focus detecting means;

drive amount calculation means for calculating a drive amount based on the defocus amount detected by said focus detecting means;

adjusted drive amount calculation means for calculating an adjusted drive amount by statistically processing the plurality of defocus amounts stored by said storing means; and two-stage control means for controlling driving of the photographic lens, comprising:

1) a pre-shutter release stage where driving of the photographic lens is based on the drive amount calculated by said drive amount calculation means prior to a shutter release operation, said control means not driving the photographic lens until a magnitude of the defocus amount exceeds a predetermined value after an in-focus state has been determined based on the detected defocus amount prior to the shutter release operation; and 2) a post-shutter release stage for controlling driving the photographic lens based on the adjusted drive amount calculated by said adjusted drive amount calculation means when the shutter release operation occurs.

2. The focus adjustment device according to claim 1, further comprising statistical processing determining means for determining whether statistical processing of the plurality of defocus amounts by said adjusted drive amount calculation means is appropriate, and for causing said adjusted drive amount calculation means to perform statistical processing of the plurality of defocus amounts when determined to be appropriate by said statistical processing determining means.

3. The focus adjustment device according to claim 1, wherein said adjusted drive amount calculation means calculates the adjusted drive amount based on an average value of the plurality of defocus amounts stored by said storing means, the defocus amounts used for statistical processing being obtained after reaching the in-focus state.

4. The focus adjustment device according to claim 1, wherein said adjusted drive amount calculation means includes a means for removing inappropriate data such that statistical processing by said adjusted drive amount calculation means is performed after removal of said inappropriate data by said removal means.

5. The focus adjustment device according claim 1, further comprising means for limiting at least one of a storage time for defocus amounts and a number of defocus amounts stored, such that statistical processing by said adjusted drive amount calculation means is performed with a recent data set.

6. A focus adjustment device for focusing a photographic lens in a camera, comprising:

focus detecting means for repeatedly detecting a defocus amount;

means for storing a plurality of defocus amounts detected by said focus detecting means;

image plane position calculation means for calculating a plurality of image plane positions based on the plurality of defocus amounts stored by said storing means;

drive amount calculation means for calculating a drive amount based on the image plane positions calculated by said image plane position calculation means;

adjusted drive amount calculation means for calculating an adjusted drive amount by statistically processing the plurality of image plane positions calculated by said image plane position calculation means; and two-stage control means for controlling driving of the photographic lens, comprising:

1) a pre-shutter release stage where driving of the photographic lens is based on the drive amount prior to a shutter release operation, and 2) a post-shutter release stage for controlling driving of the photographic lens based on the adjusted drive amount when a shutter release operation occurs.

7. The focus adjustment device according to claim 6, further including statistical processing determining means for determining whether statistical processing of the plurality of image plane positions by the adjusted drive amount calculation means is appropriate, and for causing said adjusted drive amount calculation means to perform statistical processing of the plurality of image plane positions when determined to be appropriate by said statistical processing determining means.

8. The focus adjustment device according to claim 6, wherein said adjusted drive amount calculation means calculates the adjusted drive amount based on regression analysis of the plurality of image plane positions as a function of time.

9. The focus adjustment device according to claim 6, wherein said adjusted drive amount calculation means includes a means for removing inappropriate data such that statistical processing by said adjusted drive amount calculation means is performed after removal of said inappropriate data by said removal means.

10. The focus adjustment device according to claim 6, further comprising means for limiting at least one of a storage time for image plane positions and a number of image plane positions stored, such that statistical processing by said adjusted drive amount calculation means is performed with a recent data set.

11. A focus adjustment device for focusing a photographic lens in a camera, comprising:

focus detecting means for repeatedly detecting a defocus amount;

means for storing a plurality of defocus amounts detected by said focus detecting means;

image plane position calculation means for calculating a plurality of image plane positions based on the plurality of defocus amounts stored by said storing means;

drive amount calculation means for calculating a drive amount based on the image plane positions calculated by said image plane position calculation means;

adjusted drive amount calculation means for calculating an adjusted drive amount by statistically processing the plurality of image plane positions calculated by said image plane position calculation means;

statistical processing determination means for determining whether statistical processing of the plurality of image plane positions by said adjusted drive amount calculation means is appropriate; and control means for controlling driving of the photographic lens based on the adjusted drive amount calculated by said adjusted drive amount calculation means when statistical processing of the plurality of image plane positions is determined to be appropriate by said statistical processing determination means.

12. The focus adjustment device according to claim 11, wherein said adjusted drive amount calculation means includes a means for removing inappropriate data such that statistical processing by said adjusted drive amount calculation means is performed after removal of said inappropriate data by said removal means.

13. The focus adjustment device according to claim 11, further comprising means for limiting at least one of a storage time for image plane positions and a number of image plane positions stored, such that statistical processing by said adjusted drive amount calculation means is performed with a recent data set.

14. A focus adjustment device for focusing a photographic lens in a camera, comprising:

focus detecting means for repeatedly detecting a defocus amount;

means for storing a plurality of defocus amounts detected by said focus detecting means;

drive amount calculation means for calculating a drive amount based on the defocus amount detected by said focus detecting means;

image plane position calculation means for calculating a plurality of image plane positions based on the plurality of defocus amounts stored by said storing means;

adjusted drive amount calculation means for calculating an adjusted drive amount by statistically processing the plurality of image plane positions calculated by said image plane position calculation means; and two-stage control means for controlling driving of the photographic lens:
1) a pre-shutter release stage where driving of the photographic lens is based on the drive amount calculated by said drive amount calculation means prior to a shutter release operation, said control means not driving the photographic lens until a magnitude of the defocus amount exceeds a predetermined value after an in-focus state has been determined based on the detected defocus amount prior to the shutter release operation; and
2) a post-shutter release stage for controlling driving the photographic lens based on the adjusted drive amount calculated by said adjusted drive amount calculation means when the shutter release operation occurs.

15. The focus adjusted device according to claim 14, further comprising statistical processing determining means for determining whether statistical processing of the plurality of image plane positions by the adjusted drive amount calculation means is appropriate, and for causing said adjusted drive amount calculation means to perform statistical processing of the plurality of image plane positions when determined to be appropriate by said statistical processing determining means.

16. The focus adjustment device according to claim 14, wherein said adjusted drive amount calculation means calculates the adjusted drive amount based on regression analysis of the plurality of image plane positions as a function of time.

17. The focus adjustment device according to claim 14, wherein said adjusted drive amount calculation means includes a means for removing inappropriate data such that statistical processing by said adjusted drive amount calculation means is performed after removal of said inappropriate data by said removal means.

18. The focus adjustment device according to claim 14, further comprising means for limiting at least one of a storage time for defocus amounts and a number of defocus amounts stored, such that statistical processing by said adjusted drive amount calculation means is performed with a recent data set.

19. A method for focusing a photographic lens in a camera, comprising:

repeatedly detecting a defocus amount;

storing a plurality of defocus amounts;

calculating a drive amount based on the defocus amount;

calculating an adjusted drive amount by statistically processing the plurality of defocus amounts that are stored; and controlling driving of the photographic lens:
1) based on the drive amount prior to a shutter release operation, said photographic lens not being driven until a magnitude of the defocus amount exceeds a predetermined value after an in-focus state has been determined based on the detected defocus amount prior to the shutter release operation; and
2) based on the adjusted drive amount when the shutter release operation occurs.

20. The method according to claim 19, further comprising:

determining whether statistical processing of the plurality of defocus amounts to obtain said adjusted drive amount is appropriate; and causing statistical processing of the plurality of defocus amounts when determined to be appropriate.

21. The method according to claim 19, wherein said calculation of said adjusted drive amount includes calculating the adjusted drive amount based on an average value of the stored plurality of defocus amounts, the defocus amounts used for statistical processing being obtained after reaching the in-focus state.

22. A method for focusing a photographic lens in a camera, comprising:

repeatedly detecting a defocus amount;

storing a plurality of defocus amounts;

calculating a plurality of image plane positions based on the plurality of defocus amounts that are stored;

calculating a drive amount derived from at least one of a lens drive amount and the defocus amount;

determining whether statistical processing of the plurality of image plane positions is appropriate;

if statistical processing of the plurality of image plane positions is appropriate, calculating an adjusted drive amount by statistically processing the plurality of image plane positions and controlling driving of the photographic lens based on the adjusted drive amount when the shutter release operation occurs.

* * * * *